United States Patent
Bartels et al.

(10) Patent No.: US 10,144,053 B2
(45) Date of Patent: Dec. 4, 2018

(54) METHOD FOR THE LAYER-WISE BUILDING OF BODIES COMPRISING REFRACTORY MOLD BASE MATERIAL AND RESOLES, AND MOLDS OR CORES MANUFACTURED ACCORDING TO SAID METHOD

(71) Applicant: ASK Chemicals GmbH, Hilden (DE)

(72) Inventors: Dennis Bartels, Dorsten (DE); Antoni Gieniec, Hilden (DE)

(73) Assignee: ASK Chemicals GmbH, Hilden (DE)

( * ) Notice: Subject to any disclaimer, the term of this patent is extended or adjusted under 35 U.S.C. 154(b) by 182 days.

(21) Appl. No.: 15/308,454

(22) PCT Filed: Apr. 30, 2015

(86) PCT No.: PCT/DE2015/000208
§ 371 (c)(1),
(2) Date: Nov. 2, 2016

(87) PCT Pub. No.: WO2015/165437
PCT Pub. Date: Nov. 5, 2015

(65) Prior Publication Data
US 2017/0056963 A1    Mar. 2, 2017

(30) Foreign Application Priority Data

May 2, 2014 (DE) .......................... 10 2014 106 178

(51) Int. Cl.
| | |
|---|---|
| *B22C 1/22* | (2006.01) |
| *B33Y 70/00* | (2015.01) |
| *B33Y 10/00* | (2015.01) |
| *B33Y 80/00* | (2015.01) |
| *B22C 9/02* | (2006.01) |
| *B29C 64/165* | (2017.01) |

(52) U.S. Cl.
CPC .............. *B22C 1/2253* (2013.01); *B22C 9/02* (2013.01); *B29C 64/165* (2017.08); *B33Y 10/00* (2014.12); *B33Y 70/00* (2014.12); *B33Y 80/00* (2014.12); *Y02P 10/292* (2015.11)

(58) Field of Classification Search
CPC .................................. B22C 9/02; B22C 1/2253
See application file for complete search history.

(56) References Cited

U.S. PATENT DOCUMENTS

| | | | |
|---|---|---|---|
| 4,426,467 | A | 1/1984 | Quist et al. |
| 4,474,904 | A | 10/1984 | Lemon et al. |
| 4,985,489 | A | 1/1991 | Barker et al. |
| 4,988,745 | A | 1/1991 | Iyer et al. |
| 5,405,881 | A | 4/1995 | Schneider et al. |
| 5,424,376 | A | 6/1995 | Chang et al. |
| 6,335,387 | B1 | 1/2002 | Twardowska et al. |
| 2008/0237933 | A1 | 10/2008 | Hochsmann et al. |

FOREIGN PATENT DOCUMENTS

| | | |
|---|---|---|
| DE | 102007045649 A1 | 4/2009 |
| DE | 102012020510 A1 | 4/2014 |
| DE | 102012020511 A1 | 4/2014 |
| DE | 102012020509 A1 | 6/2014 |
| EP | 0323096 A2 | 7/1989 |
| EP | 0538244 A2 | 4/1993 |
| EP | 0711213 A1 | 5/1996 |
| EP | 0882568 A2 | 12/1998 |
| EP | 1228128 A1 | 8/2002 |
| EP | 1268165 A1 | 1/2003 |
| EP | 1324842 A1 | 7/2003 |
| EP | 1509382 A1 | 3/2005 |
| WO | 0168336 A2 | 9/2001 |
| WO | 2014166469 A1 | 10/2014 |

OTHER PUBLICATIONS

Li, Y., Metal Liquid Forming Process, Beijing: Chemical Industry Press, Jul. 2007, pp. 49-51.

*Primary Examiner* — Kevin P Kerns
*Assistant Examiner* — Steven S Ha
(74) *Attorney, Agent, or Firm* — Standley Law Group LLP

(57) ABSTRACT

The invention relates to a method for the layer-wise building of bodies comprising a refractory mold base material and resoles, to three-dimensional bodies manufactured according to said method, and to the use thereof in metal casting. According to the method, the refractory mold base material is contacted with at least one ester to obtain an ester-impregnated mold material mixture.

20 Claims, No Drawings

METHOD FOR THE LAYER-WISE BUILDING OF BODIES COMPRISING REFRACTORY MOLD BASE MATERIAL AND RESOLES, AND MOLDS OR CORES MANUFACTURED ACCORDING TO SAID METHOD

The invention relates to a method for the layer-wise building of bodies comprising refractory mold base material and resoles, and to three-dimensional bodies in the form of molds or cores for metal casting produced according to said method.

Under the term rapid prototyping, various methods for manufacturing three-dimensional bodies by layer-wise building are known. An advantage of this method is the possibility of also producing complex bodies consisting of a single piece, with undercuts and hollow spaces. Using conventional methods, these bodies have to be assembled from several, individually fabricated parts. An additional advantage is that the method is capable of manufacturing the bodies without molding tools directly from the CAD data.

In EP 0538244 B1, the so-called selective laser sintering method (SLS method) is described. According to this patent, powder in the form of, for example, loose metal or plastic particles is applied by means of a drum onto a body in uniform layers and partially melted selectively by a swivelable laser beam at the sites predetermined by the CAD program, so that they adhere there both within the layer and also to the underlying layer. Preferably, sintering takes place. After the completion of the fabrication of the three-dimensional body, the latter can be removed from the unbound particles, subjected to an additional treatment, or directed to its final use.

EP 0711213 B1 represents an additional example for the layer-wise manufacturing of molded bodies. In it, the loose grains of a suitable mold base material, for example, quartz sand, which are coated with a reactive binder, are selectively bound to one another layer-wise, by curing the binder by energy addition by means of an electromagnetic radiation, for example, in the form of an infrared laser. As suitable mold base materials, in addition to quartz sand, zirconium sand, olivine sand, chromite sand, fire clay, corundum or carbon sand as well as mixtures thereof are also mentioned.

Suitable binders are warmth or heat binding resins from the group of furan, urea or amino resins, urea formaldehyde resins, furfuryl alcohol urea formaldehyde resins, phenol modified furan resins, phenol formaldehyde resins, furfuryl alcohol phenol formaldehyde resins, acryl modified phenol resins, acrylic resins or polyacrylic resins, each in liquid, solid, granulated or powdered form. To achieve its full strength, the three-dimensional body produced by repeated application and solidification of a layer can optionally be cured secondarily, for example, by heating in a furnace or with microwaves, after the removal of the unbound mold material.

According to EP 0882568 B1, the loose mold base material is coated with a suitable binder, for example, a phenol formaldehyde resin such as novolak or a resole resin. For the manufacture of the three-dimensional body, first, using a printing technique, a so-called modification agent, for example, an alcohol or an acid, is applied selectively layer-wise. The purpose of this is either to inhibit or accelerate the solidification step, i.e., the thermal curing, which follows in the second step. Which of the two variants is carried out depends on the operating procedure selected. If the modification agent represents a reaction inhibitor, the mold base material/binder mixture cures while the desired molded part forms during the heating at the sites that were not treated with a modification agent. On the other hand, in the case of a reaction accelerator, the binder and the latent curing agent react with one another at the sites provided with the modification agent and bind the particles that have been loose so far in order to form the finished component there. Said finished component can subsequently be freed, as is usually done, of loose, uncured mold material/binder mixture.

EP 1324842 B1 discloses a method, in which the loose mold base material, from which the three-dimensional body is to be built, is provided selectively layer-wise with a binder. The binder application here occurs in a manner similar to the operating procedure of an ink jet printer by means of a thin jet or of a bundle of thin jets. The curing occurs only when all the layers needed for the manufacture of the three-dimensional body have been finished. The curing reaction is triggered, for example, by flooding the entire component with a curing agent, preferably a gas.

In WO 01/68336 A2, the binder, for example, a furan resin, a phenol resin or a resole ester, is sprayed layer-wise non-selectively, but over the entire work surface of the loose mold material, and is subsequently also cured layer-wise by selective application of a curing agent such as an organic acid.

EP 1268165 B1 varies this method, in that a liquid binder is sprayed layer-wise not onto the entire work surface of the loose mold material, but selectively only onto the partial areas of the mold material to be cured subsequently. The curing occurs by layer-wise selective application of a liquid curing agent.

A development of this method is presented in EP 1509382 B1, according to the teaching of which the binder is not printed layer-wise selectively onto the mold material, but instead a mold material/binder mixture is produced, which is then cured by a selective layer-wise application of the curing agent to the sites predetermined by the CAD program.

In EP 1638758 B1, the sequence of the addition is reversed. First, the mold material is premixed with an activator (curing agent) and then the binder is applied selectively layer-wise. The curing agents mentioned comprise acids, for example, aqueous p-toluenesulfonic acid, and mentioned as binder are phenol resins, polyisocyanates, polyurethanes, epoxy resins, furan resins, polyurethane polymers, phenol polyurethanes, phenol formaldehyde furfuryl alcohols, urea formaldehyde furfuryl alcohols, formaldehyde furfuryl alcohols, peroxides, polyphenol resins, resole esters, silicates (for example, sodium silicate), salt, gypsum, bentonite, water-soluble polymers, organic acid, carbohydrates, sugar, sugar alcohols or proteins.

In particular, in practice, the acid/furan resin system according to EP 1638758 B1 has found widespread use and is used in the development of new cast parts as well as in the manufacture of individual parts or small series, in which the conventional production with molding tools would be too complicated or too expensive.

In spite of the advantages thereof, such as, for example, manufacturing speed, high mold dimensional stability, and good storage stability of the casting molds, etc., there is still a need for improvements. For example, during the casting operation, at least during iron casting, one disadvantage consists in that casting molds bound with an acid-cured furan resin can fall apart prematurely, which can lead to major casting errors.

Thus, the aim is to provide a mold material/binder/curing agent combination that enables the manufacturing of casting molds according to the rapid prototyping method, which have better thermal stability during the casting and which have a lower tendency to gas formation.

The aim is attained by casting molds having the features of claim 1. Advantageous developments are the subject matter of the dependent claims or are described below.

The casting mold according to the invention comprises at least
a) a refractory mold base material,
b) an alkaline resole resin (binder) cured by means of an ester (curing agent) and
c) optionally an inorganic additive;
and preferably
a) a refractory mold base material,
b) an alkaline resole resin cured by means of an ester and
c) an inorganic additive.

DETAILED DESCRIPTION OF THE INVENTION

As refractory mold base material (hereafter also referred to in short as mold base material) conventional and known materials can be used for the manufacture of casting molds. Suitable are, for example, quartz, zirconium or chromium ore sand, olivine, vermiculite, bauxite, fire clay as well as synthetic mold base materials, in particular more than 50% by weight of quartz sand with respect to the refractory mold base material. Mold base material is understood to refer to substances that have a high melting point (melting temperature). Preferably, the melting point of the refractory mold base material is higher than 600° C., preferably higher than 900° C., particularly preferably higher than 1200° C., and in particular preferably higher than 1500° C. The refractory mold base material is in a pourable state.

The mold base material preferably accounts for more than 80% by weight, in particular more than 90% by weight, particularly preferably more than 95% by weight of the mold material mixture.

The mean diameter of the refractory mold base materials is, as a rule, between 100 μm and 600 μm, preferably between 120 μm and 550 μm, and particularly preferably between 150 μm and 500 μm. The particle size can be determined, for example, by sieving according to DIN ISO 3310. Particularly preferable are particle shapes having a largest longitudinal extent relative to smallest longitudinal extent (at right angles with respect to one another and in each case for all the spatial directions) from 1:1 to 1:5 or 1:1 to 1:3, i.e., particle shapes that are, for example, not in the form of fibers.

Here, it is particularly suitable to use a special chromite sand marketed under the name of Spherichrome® by Oregon Resources Corporation (ORC). In Europe, Spherichrome® is marketed by Possehl Erzkontor GmbH, Lübeck. Spherichrome® differs in grain shape from the previously known South African chrome ore sand. In contrast to the latter, Spherichrome® has predominantly rounded grains. According to the preferred embodiment, Spherichrome® does not necessarily have to represent 100% by weight of the mold base material; mixtures with other mold base materials are also possible, above all quartz sand. The mixing ratio here is set according to the respective requirement of the casting mold. However, most generally, if quartz sand is used, this mixing ratio should contain at least 20% by weight of Spherichrome®, preferably at least 40% by weight, particularly preferably at least 60% by weight. Independently thereof, the mold base material comprises at least 20% by weight, preferably at least 40% by weight, and particularly preferably at least 60% by weight, of particle shapes having a ratio (mean) of largest longitudinal extent to smallest longitudinal extent (at right angle with respect to one another and in each case for all the spatial directions) of, in particular, from 1:1 to 1:3, particularly preferably, from 1:1 to 1:3.

The binders are alkaline resole resins. The resoles are produced by condensation of hydroxy aromatic compounds and aldehydes in the presence of an alkaline catalyst.

Usually, the resoles are used in a concentration from approximately 0.8% by weight to approximately 5% by weight, preferably from approximately 1% by weight to approximately 4% by weight, and particularly preferably from approximately 1% by weight to approximately 3.5% by weight, in each case with respect to the mold base material. Here, the concentration of binder within the casting mold can vary. In the thicker partial areas of the mold, the binder proportion can certainly be lower than indicated above, while, in the thinner and more complex portions, the binder content can exceed the above-mentioned limit value.

Resoles in the sense of the present invention are aromatic compounds that are bound to one another via methylene groups ($-CH_2-$) and/or via ether bridges (particularly $-CH_2-O-CH_2-$), each bearing at least one $-OH$ group (hydroxy aromatic compound).

Suitable hydroxy aromatic compounds are phenols, substituted phenols such as, for example, cresols or nonylphenol, 1,2-dihydroxybenzene (pyrocatechol), 1,2-dihydroxybenzene (resorcinol), cashew nut shell oil, i.e., a mixture of cardanol and cardol, or 1,4-dihydroxybenzene (hydroquinone) or phenolic compounds such as bisphenol A, for example. The resoles are prepared, for example, by condensation of one or more hydroxy aromatic compounds with one or more aldehydes, in particular in the presence of an alkaline catalyst such as ammonium hydroxide or of an alkali metal hydroxide. It is preferable to use alkali metal hydroxide catalysts.

Suitable aldehydes are formaldehyde, paraformaldehyde, butyraldehyde, glyoxal and mixtures thereof. Formaldehyde or mixtures containing formaldehyde primarily (with respect to the molar quantity of aldehydes) are particularly preferable.

The molar ratio of phenol to aldehyde can vary in the range from 1:1 to 1:3, but it is preferably between 1:1.2 to 1:2.6, particularly preferably between 1:1.3 and 1:2.5.

It is preferable to use resoles in which adjacent hydroxy aromatic compounds are bound in each case in ortho and/or para position (relative to the hydroxy group of the incorporated phenol/aromatic compounds) via the methylene bridges and/or the ether bridges, i.e., most of the bonds are "para" and/or ortho.

As alkaline catalysts, it is possible to use either organic bases such as, for example, amines or ammonium compounds, or inorganic bases such as, for example, alkali metal hydroxides. It is preferable to use alkali metal hydroxides, particularly preferably sodium hydroxide and/or potassium hydroxide, in the form of aqueous solutions. Mixtures of alkaline catalysts can also be used.

The molar ratio of hydroxy aromatic groups (such as phenol) to hydroxide ions in the binder system is preferably 1:0.4 to 1:1.2, and preferably 1:0.5 to 1:1.0. It is not necessary to add the entire quantity of base already at the beginning of the condensation; usually the addition occurs in two or more substeps, wherein a portion can also be added only at the end of the manufacturing process.

The manufacturing of resoles is disclosed, for example, in EP 0323096 B2 and EP 1228128 B1. Additional resole-based binders are described, for example, in U.S. Pat. No.

4,426,467, U.S. Pat. No. 4,474,904. In three patents, the resoles are cured by means of esters, wherein the curing occurs by the addition of a liquid curing agent, for example, a lactone (U.S. Pat. No. 4,426,467) or triacetin (U.S. Pat. No. 4,474,904).

In addition to the already mentioned components, the resole contains water, preferably in a quantity of 25% by weight to 50% by weight with respect to the weight of the composition. Here, the water can originate, on the one hand, from aqueous solutions which are used in the binder manufacture, on the other hand, it can also be added separately to the binder. In addition to its function as a solvent, water is also used, for example, in order to give the binder an application-appropriate viscosity of approximately 15 mPa·s to approximately 300 mPa·s, preferably from approximately 15 mPa·s to approximately 200 mPa·s, and particularly preferably from approximately 15 mPa·s to approximately 100 mPa·s. The viscosity is determined using a Brookfield rotational viscosimeter, small sample, spindle No. 21 at 100 rpm and at 25° C.

Moreover, the binder can contain up to approximately 50% by weight of additives such as alcohols, glycols, surfactants and silanes, for example. Using these additives, it is possible, for example, to increase the wettability of the mold material by the binder and the adhesion thereof to the mold material, which, in turn, can lead to improved strengths and to an increased resistance to moisture.

In this regard, a particularly positive effect is achieved with an addition of silanes, for example, gamma-aminopropyltriethoxysilane or gamma-glycidoxypropyltrimethoxysilane, at concentrations from approximately 0.1% by weight to approximately 1.5% by weight, preferably from approximately 0.2% by weight to approximately 1.3% by weight, and particularly preferably from approximately 0.3% by weight to approximately 1.0% by weight, in each case with respect to the weight of the composition.

The esters (curing agents) suitable for the curing of the resoles are known to the person skilled in the art, for example, from U.S. Pat. No. 4,426,467, U.S. Pat. No. 4,474,904 and U.S. Pat. No. 5,405,881. They comprise lactones, organic carbonates, and esters of C1 to C10 mono- and polycarboxylic acids with C1 to C10 mono- and polyalcohols. Preferable but nonlimiting examples of these compounds are gamma-butyrolactone, propylene carbonate, ethylene glycol diacetate, mono-, di- and triacetin as well as the dimethyl esters of succinic acid, glutaric acid and adipic acid, including the mixtures thereof that are known under the name DBE. Due to different saponification rates of the individual esters, the curing rate of the resoles proceeds quickly depending on the ester used, which can also influence the strengths. By mixing one or more esters, it is possible to vary the desired curing time within broad limits.

One possibility for modifying the ester component consists in adding benzyl ester resins according to U.S. Pat. No. 4,988,745, epoxy compounds according to U.S. Pat. No. 5,405,881, and/or polyphenol resins according to U.S. Pat. No. 5,424,376, in each case in quantities of up to approximately 40% by weight with respect to the ester component. In addition, the ester component can contain up to 50% by weight of additional components such as, for example, the alcohols, glycols, surfactants and silanes already mentioned in the case of the binders.

For the invention, the added quantity of curing agent is usually 10% by weight to 50% by weight, preferably 10% by weight to 40% by weight, particularly preferably 10% by weight to 30% by weight, in each case with respect to the quantity of binder.

Moreover, the mold material mixtures according to the invention can contain a proportion of an amorphous $SiO_2$. This is, in particular, a particulate amorphous $SiO_2$. Synthetically produced particulate amorphous silicon dioxide is particularly preferable.

The amorphous $SiO_2$ can be, in particular, of the following types:
  a) amorphous $SiO_2$ obtained by precipitation from an alkali silicate solution,
  b) amorphous $SiO_2$ obtained by flame hydrolysis of $SiCl_4$,
  c) amorphous $SiO_2$ obtained by the reduction of quartz sand with coke or anthracite to form silicon monoxide with subsequent oxidation to $SiO_2$,
  d) amorphous $SiO_2$ obtained from the process of thermal decomposition of $ZrSiO_4$ to $ZrO_2$ and $SiO_2$,
  e) amorphous $SiO_2$ obtained by oxidation of metallic Si by means of an oxygen-containing gas, and/or
  f) amorphous $SiO_2$ obtained by melting crystalline quartz with subsequent rapid cooling.

c) includes both processes in which the amorphous $SiO_2$ is manufactured in a targeted manner as main product as well as processes in which it is produced as byproduct, such as, for example, in the production of silicon or ferrosilicon.

As amorphous $SiO_2$, both synthetically produced and naturally occurring silicas can be used. The latter are known, for example, from DE 102007045649, although they are not preferable, since, as a rule, they have considerable crystalline contents and are therefore classified as carcinogenic. Synthetic is understood to mean amorphous $SiO_2$ that does not occur in nature, i.e., the manufacturing of which comprises, for example, an intentionally carried out chemical reaction, as brought about by a person, for example, preparation of silica sols by ion exchange processes from alkali silicate solutions, precipitation from alkali silicate solutions, flame hydrolysis of silicon tetrachloride, reduction of quartz sand with coke in electric arc furnaces in the manufacturing of ferrosilicon and silicon. The amorphous $SiO_2$ manufactured according to the last two mentioned methods is also referred to as pyrogenic $SiO_2$.

Occasionally, synthetic amorphous silicon dioxide refers only to precipitation silica (CAS No. 112926-00-8) and $SiO_2$ manufactured by flame hydrolysis (Pyrogenic Silica, Fumed Silica, CAS No. 112945-52-5), while the product that is produced in the manufacturing of ferrosilicon and silicon is referred to merely as amorphous silicon dioxide (Silica Fume, Microsilica, CAS No. 69012-64-12). For the purposes of the present invention, the product that is produced in the manufacturing of ferrosilicon or silicon is also understood to refer to amorphous $SiO_2$.

It is preferable to use precipitation silicas and pyrogenic silicon dioxide, i.e., silicon dioxide manufactured by flame hydrolysis or in the electric arc furnace. It is particularly preferable to use amorphous silicon dioxide produced by thermal decomposition of $ZrSiO_4$ (described in DE 102012020509) as well as $SiO_2$ produced by oxidation of metallic Si by means of an oxygen-containing gas (described in DE 102012020510).

Quartz glass powder (mainly amorphous silicon dioxide) which has been produced by melting and rapid renewed re-cooling from crystalline quartz, so that the particles are spherical and not in the form of splinters (described in DE 102012020511), is also preferable. The mean primary particle size of the particulate amorphous silicon dioxide can be between 0.05 µm and 10 µm, in particular between 0.1 µm and 5 µm, particularly preferably between 0.1 µm and 2 µm. The primary particle size can be determined, for example, by using dynamic light scattering (for example, Horiba LA 950)

and can be verified by scanning electron microscopy views (SEM using, for example, Nova NanoSEM 230 from the company FEI). Moreover, by means of the SEM views, details of the primary particle shape down to an order of magnitude of 0.01 μm can be made visible. The silicon dioxide samples were dispersed in distilled water for the SEM measurements and subsequently applied on an aluminum holder laminated with a copper strip, before the water was evaporated.

Moreover, the specific surface area of the particulate amorphous silicon dioxide was determined by gas adsorption measurements (BET method) according to DIN 66131. The specific surface area of the particulate amorphous $SiO_2$ is between 1 and 200 $m^2/g$, in particular between 1 and 50 $m^2/g$, particularly preferably less than 17 $m^2/g$ and even less than 15 $m^2/g$. Optionally, the products can also be mixed, for example, in order to obtain mixtures having certain particle size distributions, in a controlled manner.

The particulate amorphous $SiO_2$ can contain different quantities of byproducts. The following are mentioned as examples here:
  carbon in the case of the reduction of quartz sand with coke or anthracite
  iron oxides and/or Si in the case of the manufacturing of silicon or ferrosilicon
  $ZrO_2$ in the case of the thermal composition of $ZrSiO_4$ to form $ZrO_2$ and $SiO_2$. Additional byproducts can be $Al_2O_3$, $P_2O_5$, $HfO_2$, $TiO_2$, $CaO$, $Na_2O$ and $K_2O$, for example.

The quantity of amorphous $SiO_2$ which is added to the mold material mixture according to the invention is usually between 0.05% by weight and 3% by weight, preferably between 0.1% by weight and 2.5% by weight, and particularly preferably between 0.1% by weight and 2% by weight, in each case with respect to the mold base material.

The addition of the amorphous $SiO_2$ to the mold base material can occur in the form of an aqueous paste, as a slurry in water, or as a dry powder. The latter is preferable here. The particulate amorphous $SiO_2$ is preferably used as a powder (including dusts). The particulate amorphous silicon dioxide used preferentially according to the present invention has a water content of less than 15% by weight, in particular less than 5% by weight, and particularly preferably of less than 1% by weight.

The amorphous $SiO_2$ is usually in particulate form. The particle size of the particulate amorphous silicon dioxide is preferably less than 300 μm, preferably less than 200 μm, particularly preferably less than 100 μm, and it has, for example, a mean primarily particle size between 0.05 μm and 10 μm. The sieve residue of the particulate amorphous $SiO_2$, in the passage through a sieve with 125 μm mesh width (120 mesh) is preferably not more than 10% by weight, particularly preferably not more than 5% by weight, and most particularly preferably not more than 2% by weight. Independently thereof, the sieve residue on the sieve with a mesh width of 63 μm is less than 10% by weight, preferably less than 8% by weight. The determination of the sieve residue here occurs according to the machine sieving method described in DIN 66165 (Part 2), wherein, in addition, a chain ring is used as sieving aid.

The sequence of the addition of the amorphous $SiO_2$ to the binder and/or to the mold base material is not crucial. It can occur either before or after, or together with the binder. However, preferably the addition of the amorphous $SiO_2$ occurs first and the binder addition thereafter.

In addition, optionally other additives that are conventionally used in the foundry industries, such as, for example, ground wood fibers or mineral additives such as iron oxide, etc., can be mixed in the mold base material, wherein the proportion thereof is usually 0% by weight to 6% by weight, preferably 0% by weight to 5% by weight, and particularly preferably 0% by weight to 4% by weight, with respect to the mold base material.

Furthermore, the invention relates to a method for manufacturing a casting mold (or generally a body) comprising the steps of
a) mixing of the refractory mold base material with the ester component and optionally with the inorganic additive, as well as optionally with the additional additives, in order to obtain a mold material mixture,
b) spreading of a thin layer having a layer thickness from 1 to approximately 6, preferably 1 to approximately 5, and particularly preferably 1 to 3 grains of the mold material mixture manufactured in a) on a defined work surface,
c) selective printing of the thin layer of the mold material mixture with the binder at the sites predetermined by the CAD data, wherein the binder cures at least partially as a result of the contact with the ester,
d) multiple repetitions of the steps b) and c) until the fabrication of the casting mold is completed,
e1) secondary curing of the partially cured casting mold in a furnace or by microwave without prior removal of the unbound mold material mixture
or, as an alternative to e1)
e2) removal of the unbound mold material mixture from the at least partially cured casting mold.

As soon as the strengths allow it, after step e1), the unbound mold material mixture can be removed from the casting mold, and said casting mold can be led to the further treatment, for example, to the preparation for the metal casting.

Following step e2), the casting mold, if necessary, can be cured secondarily by conventional means such as storage at increased temperatures or by microwaves. As soon as the strengths allow it, the casting mold can be led to the further treatment, for example, to the preparation for the metal casting.

In the two alternatives, after the at least partially cured casting mold has been removed, the unbound mold material mixture can be led to the production of another casting mold.

The printing occurs, for example, by means of a printing head having a plurality of nozzles, wherein the nozzles are preferably selectively controllable individually. According to an additional design, the printing head is moved in a controlled manner in at least one plane by a computer, and the nozzles apply the liquid binder layer-wise. The printing head can be, for example, a drop-on-demand printing head with bubble jet or piezo technology.

Based on the following examples, the invention will be explained in greater detail, without being limited to said examples.

Examples

The influence of the mold base material and of the microsilicas on the strengths was tested first using conventional test specimens, the so-called Georg-Fischer test bars.

The manufacturing of the casting molds by the 3-D printing technology, which was carried out later, confirmed the findings obtained in the process.

1. Manufacturing of the Specimens
1.1. Without Addition of $SiO_2$

The mold material was introduced into the bowl of a mixer from the company Hobart (model HSM 10). Subsequently, under stirring, first the curing agent and then the binder were added, and mixed in each case for 1 minute intensively with the mold base material. The type of the mold base material, of the curing agent and of the binder, as well as the respective added quantities are listed in Tab. 1.

TABLE 1

| Mixture | Molding material [100 GT] | SiO$_2$ [a] [GT] | Curing agent [b] [GT] | Binder [c] [GT] |
|---|---|---|---|---|
| 1 | H 32 [d] | | 0.3 | 1.5 |
| 2 | H 32 [d] | 0.3 | 0.3 | 1.5 |
| 3 | Spherichrome [e] | 0.3 | | 1.5 |
| 4 | Spherichrome [e] | 0.3 | 0.3 | 1.5 |
| 5 | Chromite [f] | | 0.3 | 1.5 |
| 6 | Chromite [f] | 0.3 | 0.3 | 1.5 |
| 7 | Bauxite [g] | | 0.3 | 1.5 |
| 8 | Bauxite [g] | 0.3 | 0.3 | 1.5 |
| 9 | Zirconium [h] | | 0.3 | 1.5 |
| 10 | Zirconium [h] | 0.3 | 0.3 | 1.5 |
| 11 | Cerabeads [i] | | 0.3 | 1.5 |
| 12 | Cerabeads [i] | 0.3 | 0.3 | 1.5 |

[a] Possehl Mikrosilica POS B-W 90 LD (Possehl Erzkontor GmbH; manufacturing process: Production of ZrO$_2$ and SiO$_2$ from ZrSiO4
[b] Catalyst 5090 (ASK Chemicals GmbH) Triacetin
[c] NOVASET 700 RPT
[d] Quartz sand holders (MK 032) Quarzwerk
[e] Chromite sand (Oregon Resources Corporation—in Europe—company Possehl Erzkontor GmbH)
[f] Chromium ore sand 0.1-0.4 MM
[g] Bauxite Sand H 27
[h] Zirconium sand (East)
[i] Cerabeads 650

1.2. With Addition of SiO$_2$

The procedure used was as in 1.1., except that, after the addition of curing agent, the synthetic amorphous SiO$_2$ was also added and also mixed in for 1 minute. The type of the mold base material, of the curing agent and of the binder as well as the respective quantities added are listed in Table 1.

2. Manufacture of Test Bars

For the testing of the specimens, rectangular block test bars with the dimensions 220 mm×22.36 mm×22.36 mm were produced (so-called Georg-Fischer bars).

A portion of the mixtures prepared according to 1. was introduced into a molding tool with 8 engravings, compacted by compression with a hand plate, and, after the expiration of the stripping time, removed from the molding tool.

The processing time (PT), i.e., the time within which a mixture can be compacted without problem, was determined visually. The fact that the processing time has been exceeded can be seen if a mixture no longer flows freely but rolls off in slabs. The processing times of the individual mixtures are indicated in Table 2.

For the determination of the stripping time (ST), i.e., the time after which a mixture has solidified sufficiently so that it can be removed from the molding tool, a second portion of the respective mixture was introduced by hand into a round mold having a height of 100 mm and a diameter of 100 mm, and also compacted with a hand plate.

Subsequently, the surface hardness of the compacted mixture was tested at certain time intervals using the Georg-Fischer surface hardness tester. As soon as a mixture is sufficiently hard so that the test ball no longer penetrates into the core surface, the stripping time has been reached. The stripping times of the individual mixtures are indicated in Table 2.

3. Testing of the Bending Strengths

For the determination of the bending strengths, the test bars were inserted into a Georg-Fischer strength testing apparatus equipped with a 3-point bending device, and the force that led to the rupturing of the test bars was measured. The bending strengths were determined according to the following scheme:
4 hours after the molding
24 hours after the molding
24 hours after the molding plus 30 min post tempering at 120° C.

The results are listed in Tab. 2

TABLE 2

| | | Bending strengths [N/cm$^2$] | | |
|---|---|---|---|---|
| Mixture | PT [a]/ST [b] [min] | 4 hours | 24 hours | 24 hours [c] 120° C./30 min/cold |
| 1 | 5 | 22 | 155 | 210 | 250 |
| 2 | 5 | 25 | 160 | 220 | 310 |
| 3 | 4 | 35 | 190 | 295 | 435 |
| 4 | 4 | 30 | 310 | 420 | 895 |
| 5 | 2 | 13 | 195 | 200 | 140 |
| 6 | 2 | 12 | 240 | 230 | 145 |
| 7 | 1 | 16 | 205 | 285 | 300 |
| 8 | 1 | 17 | 245 | 310 | 360 |
| 9 | 2 | 15 | 210 | 275 | 320 |
| 10 | 2 | 15 | 255 | 300 | 360 |
| 11 | 1 | 20 | 165 | 270 | 320 |
| 12 | 1 | 18 | 240 | 265 | 410 |

[a] Processing time
[b] Stripping time
[c] 24 h old cores/tempered for 30 min at 120° C./strengths—measured after cooling From Table 2 one sees that
Spherichrome® is superior to the South African chromium ore sand used to date in the foundries for all the strengths.
In the case of secondary tempering, Spherichrome® exhibits a strength increase that largely exceeds that of the other mold base materials tested.
The addition of microsilica improves the strengths for all the mold base materials.

4. Casting Tests

In the case of the uncoated casting with iron at 1400° C., casting molds that were manufactured according to the 3-D printing technique using an ester-cured phenol resole exhibited a smoother cast surface and fewer gas inclusions than casting molds that were manufactured by means of the 3-D printing technology using an acid-curing furan resin.

The invention claimed is:

1. A method for building of a body in a layer-wise manner, comprising the steps of:
combining at least one refractory mold base material and at least one ester, obtaining an ester-impregnated mold material mixture,
spreading the ester-impregnated mold material mixture into a thin layer having a layer thickness in the range of 1 to 6 grains,
printing selected areas of the thin layer with a binder comprising at least resoles for curing the selected areas, and
repeating the spreading and printing steps to produce an at least partially cured three-dimensional body.

2. The method according to claim 1, additionally comprising the step of:
removing any unbound molding material mixture from the at least partially cured three-dimensional body;
wherein an optional step of secondary curing of the partially cured three-dimensional body, in a furnace or by microwaves, may precede the removing step.

3. The method according to claim 1, wherein the refractory mold base material is selected from the group consisting of: quartz sand, zirconium sand, chromium ore sand, olivine, vermiculite, bauxite, fire clay, glass beads, glass granulate, aluminum silicate hollow microspheres and mixtures thereof.

4. The method according to claim 1, wherein more than 80% by weight of the mold material mixture is refractory mold base material.

5. The method according to claim 1, wherein the refractory mold base material has a mean particle diameter of 100 μm to 600 μm, determined by sieve analysis.

6. The method according to claim 1, wherein the mold material mixture comprises amorphous silicon dioxide.

7. The method according to claim 6, wherein the amorphous silicon dioxide is selected from the group consisting of: precipitation silica, pyrogenic silicon dioxide produced by flame hydrolysis or in the electric arc furnace, amorphous silicon dioxide produced by thermal decomposition of $ZrSiO_4$, silicon dioxide produced by oxidation of metallic silicon by means of an oxygen-containing gas, quartz glass powder with spherical particles, which was prepared by melting and rapid re-cooling from crystalline quartz, and mixtures thereof.

8. The method according to claim 6, wherein the amorphous silicon dioxide is used in quantities from 0.1 to 2% by weight with respect to the refractory mold base material.

9. The method according to claim 6, wherein the amorphous silicon dioxide has a water content of less than 5% by weight.

10. The method according to claim 6, wherein the amorphous silicon dioxide is particulate amorphous silicon dioxide, with a mean primary particle diameter, determined by dynamic light scattering, between 0.05 μm and 10 μm.

11. The method according to claim 1, wherein the resoles are added in a quantity from 0.8 to 5% by weight with respect to the weight of the refractory mold base material.

12. The method according to claim 1, further comprising the step of:
curing the body with $CO_2$.

13. The method according to claim 1, wherein the mold material mixture contains at least one base.

14. The method according to claim 1, wherein the resoles used in the printing step are in the form of an aqueous alkaline solution.

15. The method according to claim 14, wherein the aqueous alkaline solution has a solid content from 30 to 75% by weight and a pH above 12.

16. The method according to claim 1, wherein the ester is an ester compound or a phosphate ester compound that can undergo alkaline hydrolysis.

17. The method according to claim 1, wherein the body is a mold or a core for metal casting.

18. The method according to claim 1, wherein the printing step is practiced using a printing head comprising a plurality of nozzles.

19. The method according to claim 18, wherein the printing head can be moved in a controlled manner by a computer at least in one plane, and the nozzles apply the liquid binder layer-wise.

20. The method according to claim 18, wherein the printing head is a drop-on-demand printing head with bubble jet or piezo technology.

* * * * *